Nov. 3, 1942.  G. FLOYD  2,300,493
ROTARY INTERNAL COMBUSTION ENGINE
Filed Nov. 18, 1941  4 Sheets-Sheet 1
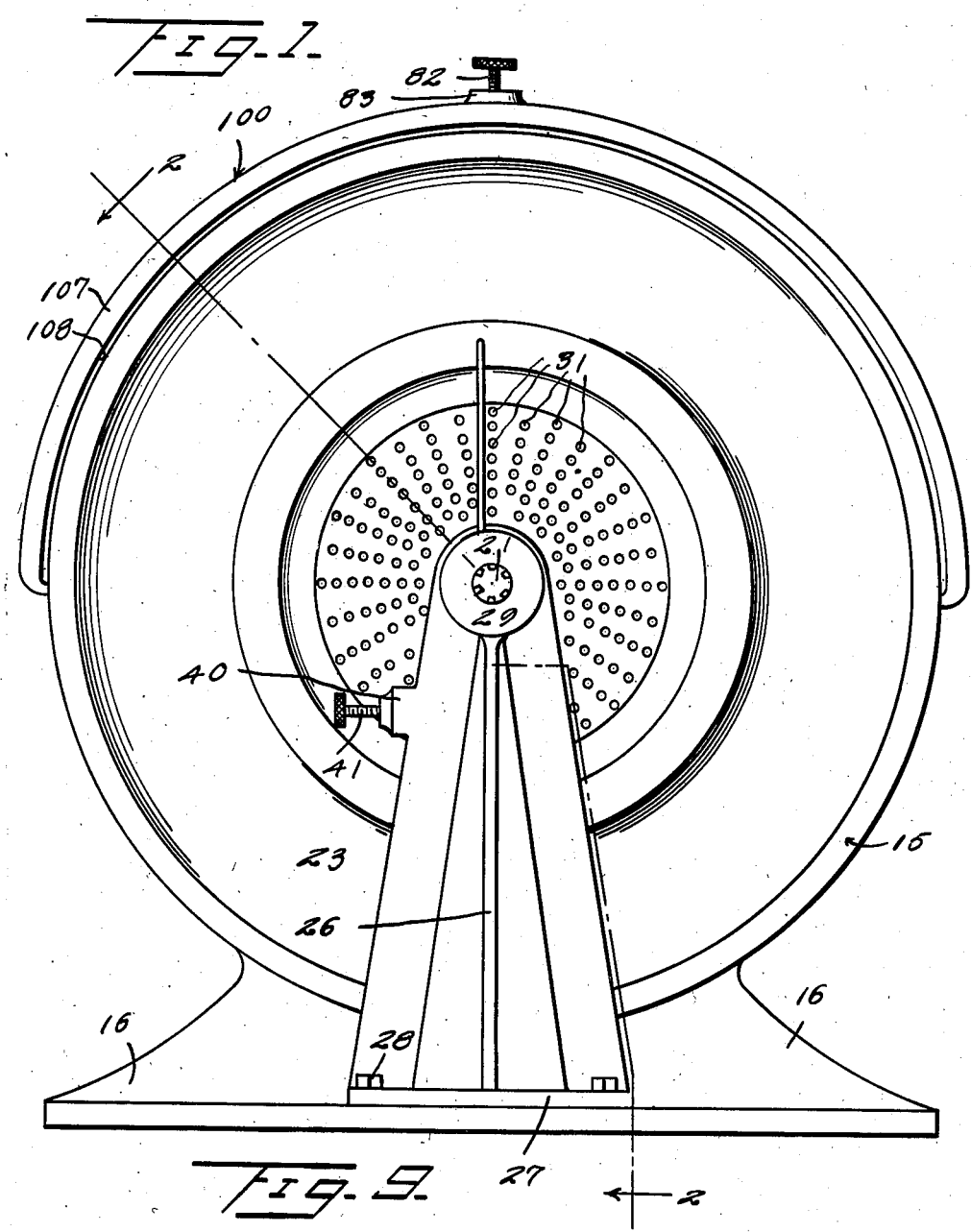
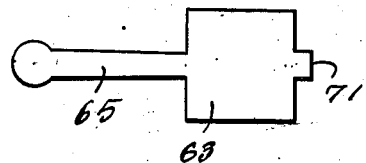
Inventor
George Floyd
By Kimmel & Crowell
Attorneys

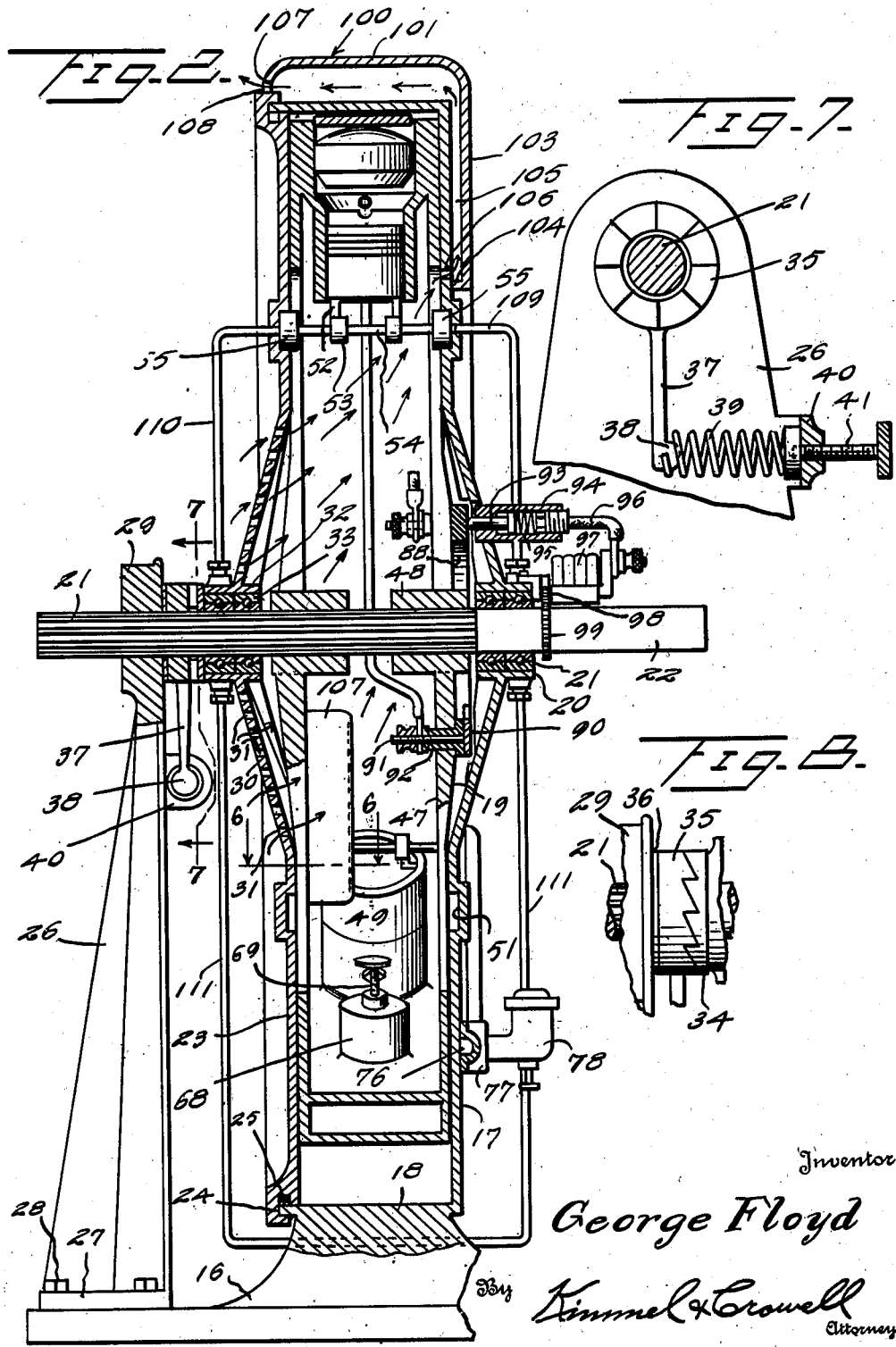

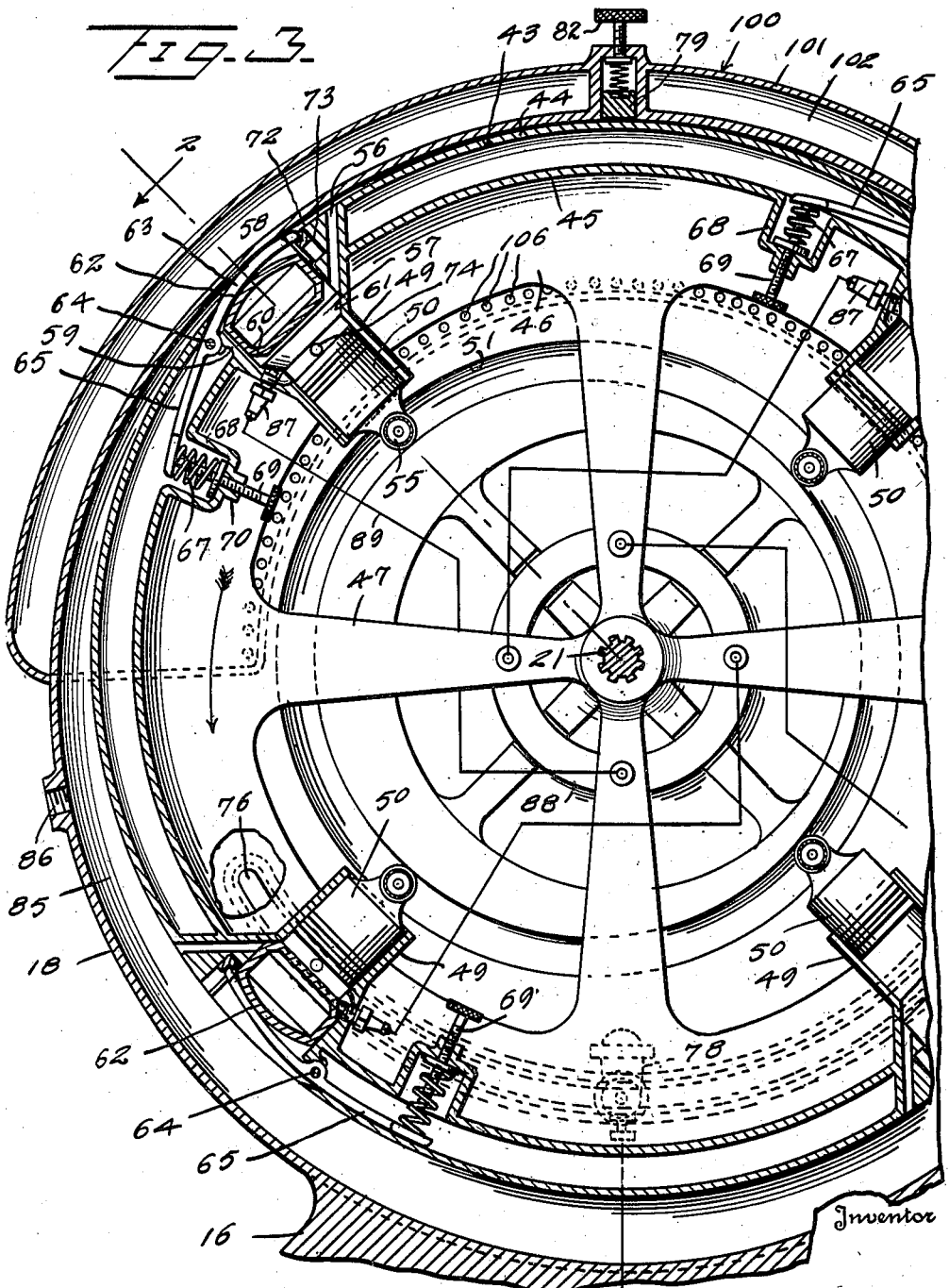

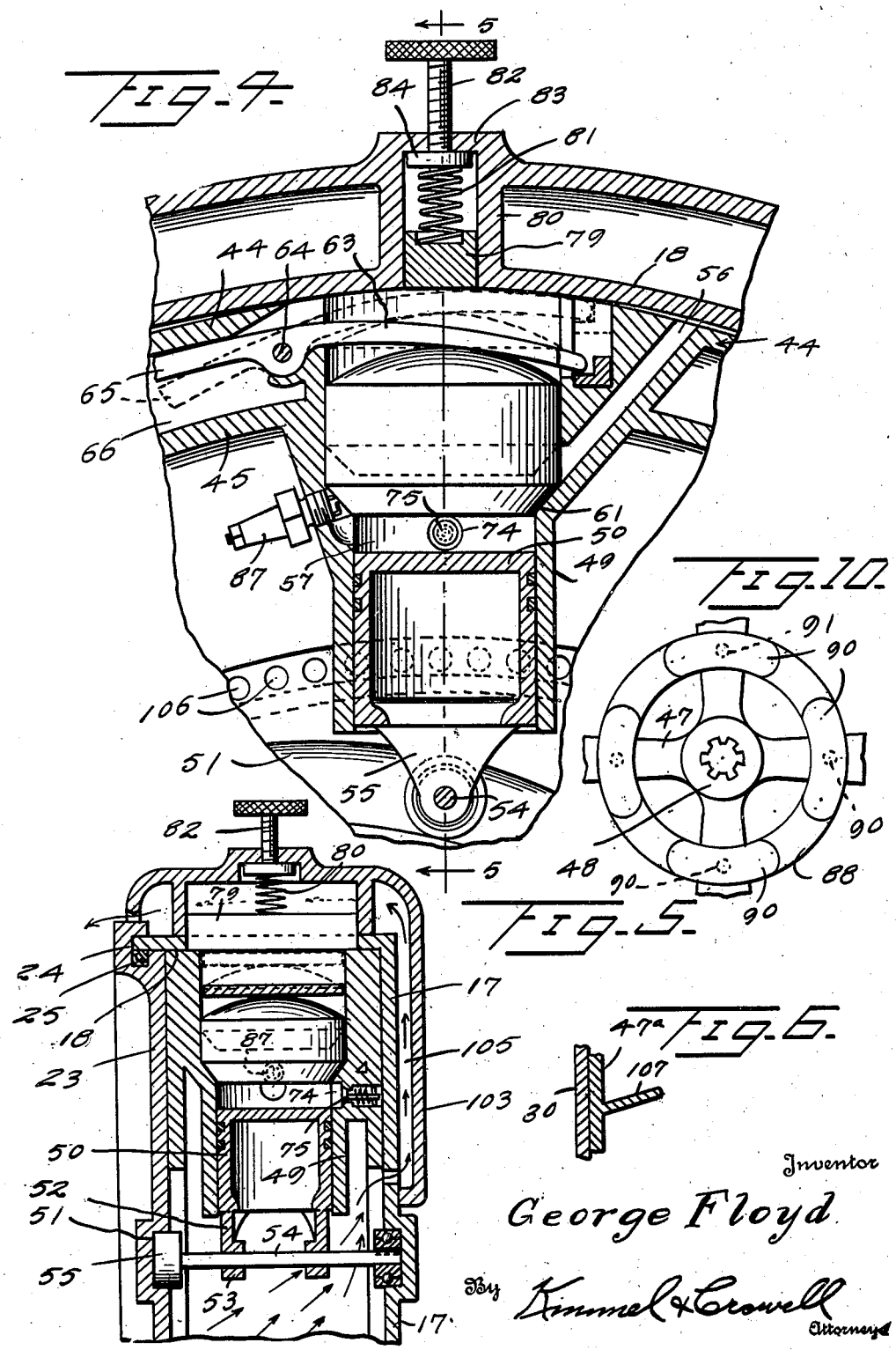

Patented Nov. 3, 1942

2,300,493

UNITED STATES PATENT OFFICE 2,300,493

ROTARY INTERNAL COMBUSTION ENGINE

George Floyd, Portsmouth, Ohio, assignor of one-third to Earl C. Kirk, Portsmouth, Ohio, jointly Application November 18, 1941, Serial No. 419,654

6 Claims. (Cl. 123—17)

This invention relates to rotary internal combustion engines.

An object of this invention is to provide an improved rotary engine which embodies relatively simple construction and which includes an outer stationary housing and a rotary driving structure therein.

Another object of this invention is to provide an improved means for drawing the fuel into the combustion chambers.

A further object of this invention is to provide an automatic combined intake and exhaust valve structure.

A further object of this invention is to provide an improved means for igniting the fuel charge.

A further object is to provide an improved means for cooling the exhaust manifold and combustion chamber.

A further object of this invention is to provide in a rotary engine a plurality of radially arranged rotary pistons and an improved means for effecting reciprocation thereof coactive with rotation.

A further object of this invention is to provide an improved sealing means constituting a rotary vane for each piston cylinder.

A further object of this invention is to provide a pivoted seal and vane for each cylinder which also acts as a valve operator for moving a sleeve valve to closed position and holding the valve in closed position during the compression cycle.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

In the drawings:

Figure 1 is a detail side elevation of a rotary internal combustion engine constructed according to an embodiment of this invention, Figure 2 is a sectional view taken on the line 2—2 of Figure 1, Figure 3 is a fragmentary transverse sectional view taken vertically through the engine, Figure 4 is a fragmentary enlarged vertical section through one of the radial cylinders showing the cylinder in substantially firing position.

Figure 5 is a sectional view taken on the line 5—5 of Figure 4,

Figure 6 is a fragmentary sectional view taken on the line 6—6 of Figure 2,

Figure 7 is a fragmentary sectional view taken on the line 7—7 of Figure 2,

Figure 8 is a fragmentary side elevation of the side plate pressure means.

Figure 9 is a plan view of one of the sleeve valve rock levers, and

Figure 10 is a detail front elevation of the distributor ring for the spark plugs.

Referring to the drawings the numeral 15 designated generally a stationary outer housing or casing which is mounted on a base 16. The casing or housing 15 includes a vertical side wall 17 which is formed integral with a cylindrical wall or cylinder 18. The side wall 17 is formed with a flared center part 19 having a bushing 20 formed integral therewith within which antifriction bearings 21 engage. A drive shaft 22 is rotatably mounted in the bearings 21 and extends axially through the housing 15. The housing 15 also includes a second removable side wall 23 which is formed adjacent its outer edge portion with an inwardly opening groove or channel 24 within which the adjacent end of the cylinder 18 is adapted to engage.

A sealing element 25 is also mounted in the groove 24 so as to seal the adjacent edge of the cylinder 18 within the groove 24. A shaft supporting standard 26 is secured at its lower end 27 by fastening devices 28 to the base 16 and is provided at its upper end with a bearing 29 through which the shaft 22 rotatably engages. The side wall 23 at its central portion is provided with a flared wall 30 formed with a plurality of air inlet openings 31, the purpose for which will be hereinafter described. The flared central wall 30 is of substantially conical configuration and is provided with a cylindrical bushing or boss 32 within which anti-friction bearings 33 engage. In order to provide a means whereby the side plate or wall 23 may be yieldably held in sealing position with respect to the cylinder 18, the boss or bushing 32 is provided at its outer end with a toothed clutch element 34 which is fixed relative to the bushing 32.

A rockable clutch element 35 is disposed in engagement with the clutch element 34 and a thrust washer 36 is interposed between the outer side of the clutch element 35 and the inner side of the bearing 29. An elongated arm or lever 37 is fixedly carried by the movable clutch element 35 and is provided at its lower end with a head or knob 38. The movable clutch element 35 is constantly urged in a direction to maintain the side plate 23 in cylinder sealing position by means of a tensionable spring 39 which at one end engages about the head or knob 38. The standard 26 is provided with a right angularly disposed ear 40 through which a spring tensioning screw 41 is threaded. A washer or annular plate 42 is swively engaged with the inner end of the screw 41 and bears against the adjacent or outer end of the spring 39 so that adjustment of the screw 41 will place the lever 37 and the clutch element 35 under the desired tension.

A rotor generally designated as 43 is rotatably mounted within the cylinder 18 and is disposed eccentrically with respect to the axial center of the cylinder 18. The rotor 43 is splined on the shaft 21. The rotor 43 comprises an outer cylindrical wall 44, an inner cylindrical wall 45, and annular side walls 46. The side walls 46 rotatably engage the side walls 17 and 23 of the housing 15 and preferably the side walls 46 are formed integral with radial spokes 47 which are carried by a pair of hubs 48 which are splined on the shaft between the bearings 21 and 33.

A plurality of radially arranged piston cylinders 49 are formed integral with the rotor 43 and each piston cylinder 49 has slidable therein a piston 50. The piston 50 is reciprocated in the cylinder 49 during the rotation of the rotor 43 by means of a pair of eccentrically disposed cam tracks 51 which are formed in the inner sides of the casing side walls 17 and 23. Each piston is provided with a pair of inwardly extending arms 52 having bosses 53 through which a roller shaft or wrist pin 54 engages. The wrist pin 54 has rotatably mounted on the opposite ends thereof rollers 55 which engage within the cam tracks 51. The piston cylinder 49 has communicating therewith a port 56 which also communicates with the inside of the cylinder 18. The port 56 at its inner end communicates with a combustion chamber and compression chamber 57 which is formed at the outer end portion of the cylinder 49. A radially slidable hollow sleeve valve 58 is disposed outwardly of each cylinder 49, and is slidable in a cylindrical guide 59 which is formed outwardly from the cylinder 49.

The valve 58 is formed at its inner end with a valve seat engaging portion 60 which is adapted to engage on a substantially frusto-conical valve seat 61 which is formed about the combustion chamber 57. The sleeve valve 58 at its outer end is formed with a dome shaped head 62 which is adapted to engage the inner side of a valve operating lever 63. The lever 63 is rockably mounted on a shaft or pin 64 and the lever 63 has formed integral therewith an arm 65 which extends into the space 66 between the outer cylindrical wall 44 and the inner wall 45 of the rotor 43. The arm 65 at its free end has engaged therewith a lever rocking spring 67 which is mounted within a housing 68 formed integral with and extending inwardly from the inner wall 45.

A lever limiting bolt or screw 69 is threaded through a boss 70 carried by the housing 63 and is adapted to engage the free end of the arm 65 so as to limit the inward swinging movement of the arm 65 and the outward swinging movement of the lever or vane 63. In order to provide a means whereby the lever 63 will not place undue pressure on the sleeve valve 58, the lever 63 is provided with an extension or lug 71 which is engageable with a slide member 72 slidable in a guide 73 formed in the rotor 43 at one side of the valve guide member 59. When the lever 63 is rocked to its innermost position the sleeve valve 58 will be in contact with the valve seat 61 and the lug 71 will force the slide plate 72 to its inner position at the bottom of the guide 73.

The cylinder 49 is formed with a fuel intake port 74 in its outer side at a point inwardly from the valve seat 61 and a spring pressed intake valve 74 is adapted to normally close the port 74. The valve 75 is biased to a closed position and the port 74 during the intake cycle of the engine is adapted to rotate in registry with an intake port 76 which is formed in the outer wall 17. The intake port 76 is of elongated longitudinally arcuate configuration and has secured to the outer side thereof an intake manifold 77.

A carburetor 78 is connected with the manifold 77 and is adapted to be connected to a source of liquid fuel supply (not shown). The rotor 43 is eccentrically mounted within the cylinder 18 in a position whereby the rotor 43 will be in substantial contact with the inner surface of the cylinder 18 at the top of the latter. In order to provide a sealing means between the cylinder 18 and the top of the rotor 43, I have provided a spring tensioned sealing bar 79 which is slidable in a guide structure 80 carried by the cylinder 18 and extending upwardly therefrom. The bar 79 is normally held in contact with the peripheral surface of the rotor 43 by means of one or more springs 81 which are tensioned by means of a spring tensioning bolt or screw 82 threaded through an outer wall 83 formed integral with the guide walls 80.

The screw 82 may be provided at its inner end with a head or cap 84 bearing against the outer end of the spring 81. The space 85 between the inner surface of the cylinder 18 and the peripheral surface of the rotor 43 at a point spaced from the compression retaining bar 79 or vane constitutes the exhaust manifold, and the cylinder 18 is provided with exhaust port 86 communicating with the manifold or exhaust chamber 85. The port 86 is positioned at a point substantially greater than 90 degrees from the abutment 79 as shown in Figure 3.

A spark plug 87 is threaded through the outer end portion of the cylinder 49 in a position for igniting the compressed fuel gases which are positioned in the combustion chamber 57. The spark plug 87 is connected to an annular distributor ring 88 by means of a conductor 89. The ring 88 is of insulated construction and is fixed to the outer side of certain of the spokes 47. The ring 88 as shown in Figure 10 is provided with a plurality of longitudinally arcuate metal contacts 90, and terminals 91 are fixed relative to the contacts 90 and extend through the spokes 47. The terminals 49 are insulated from the spokes 47 by insulating sleeves 92 which extend through the spokes 47. A wiper 93 is adapted to engage the outer side of the ring 88 and the outer sides of the contacts 90 and is slidably mounted in a cylindrical housing 94 which is carried by the inner frusto-conical wall 19 of the housing 15. The contact 93 is under tension from a spring 95 and is electrically connected by means of a conductor 96 to a magneto or generator 97. The magneto or generator 97 is operatively connected with the shaft 22 by conventional means (not shown). The magneto 97 includes a pivoted circuit breaking member 98 which is operated by means of a cam 99 fixed to the shaft 22. There are as many contacts carried by the insulated ring 88 as there are cylinders 49.

In order to provide a means whereby the upper portion of the cylinder 18 may be cooled, I have provided a housing generally designated as 100. The housing 100 includes a longitudinally arcuate outer wall 101 which is disposed in spaced relation to the outer side of the cylinder 18 thereby forming an air chamber 102. The wall 101 has formed integral therewith a right angularly disposed side wall 103 which is of segmental construction and is provided at its inner edge with an inwardly extending flange 104 engageable against the outer side of the side wall 17. The side wall 103 forms an air duct or chamber 105 communicating with the air chamber or channel 102 and the side wall 17 is provided with a plurality of circumferentially spaced apart openings 106 which communicate with the duct or passage 105 and with the interior of the rotor 43.

In Figure 2 it will be seen that the air enters the openings 31 in the wall 30 and passes interiorly of the rotor 43 and then out through the openings 106 into the housing 100. The air is drawn into the housing 15 by means of a plurality of fan blades or vanes 107 which are fixed to the inner sides of the spokes 47a positioned in confronting relation to the frusto-conical side wall 30. The housing 100 is also formed with an arcuate flange 107 on the edge of the wall 101 opposite from the wall 103, and the flange 107 is disposed in spaced relation to the adjacent edge of the side wall 23 thereby forming an air outlet or exhaust passage 108. The engine hereinbefore described is adapted to be suitably lubricated by means of a plurality of lubricating pipes 109 which are connected at one end to the side wall 17 in a position for lubricating the cam track 51 and are connected at the opposite ends thereof to the boss 20. Other lubricant conducting pipes 110 and 111 are adapted to be connected to the housing 15 and to a suitable oil pump (not shown) so as to force the lubricant to the desired portions of the engine.

In the operation of this engine the engine will rotate in a counter-clockwise direction as viewed in Figure 3. When a cylinder 49 is disposed at the leading end of the intake port 76 the port 74 will be in communication with the port 76. At this time the piston 50 will be moving inwardly of the cylinder 49 so that as the rotor 43 rotates past the intake port 76, the fuel will be drawn into the cylinder 49 by inward movement of the piston 50. The intake port 76 is of sufficient length to provide for the fuel being drawn into the cylinder 49 during the entire time that the piston 50 is on its suction stroke.

After the cylinder 49 passes the rear or trailing end of the intake port 76 the intake port 74 of the cylinder 49 will be closed and in confronting position to the imperforate portion of the side wall 17. Further rotation of the rotor 43 will cause the piston 50 to be moved outwardly on its compression stroke and at this time the rock lever 63 will yieldably hold the sleeve valve 58 against outward movement. The spring 67 is of such tension as to maintain the valve member 58 in engagement with the seat 61 during the compression stroke of the engine. When the port 56 is disposed closely adjacent the transverse sealing member or abutment 79 the compressed fuel in the combustion chamber 57 will be ignited. The igniting of the fuel in the combustion chamber 57 will force the sleeve valve 58 outwardly so that the rock lever 63 will be in contact with the inner surface of the cylinder 18.

The rock lever 63 constitutes a rotary vane so that the expanding gases will not be able to pass to the left of the lever 63 and into the exhaust manifold or chamber 85. The expanding gases between the abutment 79 and the vane 63 will force the rotor 43 to rotate in a counter-clockwise direction and during the rotation of the rotor on its power stroke or cycle, the vane 63 will be in sliding contact with the inner side of the cylinder 18. After the vane 63 passes the exhaust port 86 the burned gases will pass out through the exhaust port 86 and at this time the spring 67 will force the rockable vane 63 to rock inwardly and move the sleeve valve 58 to a port closing position for closing the port 56.

With the sleeve valve 58 in a closed position the cylinder 49 will be disposed adjacent the leading end of the intake port 76 where the cycle of operation will be repeated. The distributor ring 86 has the contact members 90 thereof so arranged that the electric current will flow to the spark plug 87 at the proper time or when the port 56 has just passed the abutment 79.

What I claim is:

1. A rotary internal combustion engine comprising a stationary housing including a cylindrical wall and opposite end walls, a rotor in said housing, means eccentrically mounting said rotor for rotation in said housing whereby said rotor will substantially contact said cylindrical wall at one point, a plurality of radially arranged piston cylinders carried by said rotor, pistons slidable in said cylinders, an eccentrically disposed cam track carried by said housing, means carried by each piston engageable with said track for reciprocating said pistons upon rotation of said rotor, a combustion chamber carried by said rotor outwardly of each cylinder, a sleeve valve correlated with each piston, said rotor having a port communicating with a combustion chamber and with the interior of said housing, a normally closed intake valve carried by each cylinder, one of said end walls having an elongated longitudinally arcuate fuel intake port for registration with said intake valve for a portion of the rotation of said rotor, a stationary spring-pressed abutment carried by said housing at said contact point, and a swinging vane carried by said rotor.

2. A rotary internal combustion engine comprising a stationary housing including a cylindrical wall and opposite end walls, a rotor in said housing, means eccentrically mounting said rotor for rotation in said housing whereby said rotor will substantially contact said cylindrical wall at one point, a plurality of radially arranged piston cylinders carried by said rotor, pistons slidable in said cylinders, an eccentrically disposed cam track carried by said housing, means carried by each piston engageable with said track for reciprocating said pistons upon rotation of said rotor, a combustion chamber carried by said rotor outwardly of each cylinder, a sleeve valve correlated with each piston, said rotor having a port communicating with a combustion chamber and with the interior of said housing, a normally closed intake valve carried by each cylinder, one of said end walls having an elongated longitudinally arcuate fuel intake port for registration with said intake valve for a portion of the rotation of said rotor, a stationary spring-pressed abutment carried by said housing at said contact point, and a vane rockably carried by said rotor and disposed in a position for engagement with said sleeve valve whereby outward movement of said sleeve valve under explosive pressure will move said vane into contact with said cylindrical wall.

3. A rotary internal combustion engine comprising a stationary housing including a cylindrical wall and opposite end walls, a rotor in said housing, means eccentrically mounting said rotor for rotation in said housing whereby said rotor will substantially contact said cylindrical wall at one point, a plurality of radially arranged piston cylinders carried by said rotor, pistons slidable in said cylinders, an eccentrically disposed cam track carried by said housing, means carried by each piston engageable with said track for reciprocating said pistons upon rotation of said rotor, a combustion chamber carried by said rotor outwardly of each cylinder, a sleeve valve correlated with each piston, said rotor having a port communicating with a combustion chamber and with the interior of said housing, a normally closed intake valve carried by each cylinder, one of said end walls having an elongated longitudinally arcuate fuel intake port for registration with said intake valve for a portion of the rotation of said rotor, a stationary spring-pressed abutment carried by said housing at said contact point, a vane rockably carried by said rotor and disposed in a position for engagement with said sleeve valve whereby outward movement of said sleeve valve under explosive pressure will move said vane into contact with said cylindrical wall, and yieldable means engaging said latter abutment constantly urging said latter abutment away from said cylindrical wall.

4. A rotary internal combustion engine comprising a stationary housing including a cylindrical wall and opposite end walls, a rotor in said housing, means eccentrically mounting said rotor for rotation in said housing whereby said rotor will substantially contact said cylindrical wall at one point, a plurality of radially arranged piston cylinders carried by said rotor, pistons slidable in said cylinders, an eccentrically disposed cam track carried by said housing, means carried by each piston engageable with said track for reciprocating said pistons upon rotation of said rotor, a combustion chamber carried by said rotor outwardly of each cylinder, a sleeve valve correlated with each piston, said rotor having a port communicating with a combustion chamber and with the interior of said housing, a normally closed intake valve carried by each cylinder, one of said end walls having an elongated longitudinally arcuate fuel intake port for registration with each intake valve for a portion of the rotation of said rotor, a stationary spring-pressed abutment carried by said housing at said contact point, a vane rockably carried by said rotor and disposed in a position for engagement with said sleeve valve whereby outward movement of said sleeve valve under explosive pressure will move said vane into contact with said cylindrical wall, yieldable means engaging said latter abutment inwardly, said yieldable means being of such tension as to hold said sleeve valve in closed position under normal compression pressure, and means limiting the outward rocking of said latter abutment.

5. A rotary internal combustion engine comprising a stationary housing including a cylindrical wall and opposite end walls, a rotor in said housing, means eccentrically mounting said rotor for rotation in said housing whereby said rotor will substantially contact said cylindrical wall at one point, a plurality of radially arranged piston cylinders carried by said rotor, pistons slidable in said cylinders, an eccentrically disposed cam track carried by said housing, means carried by each piston engageable with said track for reciprocating said pistons upon rotation of said rotor, a combustion chamber carried by said rotor outwardly of each cylinder, a sleeve valve correlated with each piston, said rotor having a port communicating with a combustion chamber and with the interior of said housing, a normally closed intake valve carried by each cylinder, one of said end walls having an elongated longitudinally arcuate fuel intake port for registration with said intake valve for a portion of the rotation of said rotor, a stationary spring-pressed abutment carried by said housing at said contact point, a cooling manifold about a portion of said housing, said housing having air openings in an end wall thereof communicating with the atmosphere and the interior of said housing and rotor, said housing also having openings in the other end wall thereof communicating with said cooling manifold, air circulating blades carried by said rotor, and a vane carried by said rotor outwardly of each piston cylinder.

6. A rotary internal combustion engine comprising a stationary housing including a cylindrical wall and opposite end walls, a rotor in said housing, means eccentrically mounting said rotor for rotation in said housing whereby said rotor will substantially contact said cylindrical wall at one point, a plurality of radially arranged piston cylinders carried by said rotor, pistons slidable in said cylinders, an eccentrically disposed cam track carried by said housing, means carried by each piston engageable with said track for reciprocating said pistons upon rotation of said rotor, a combustion chamber carried by said rotor outwardly of each cylinder, a sleeve valve correlated with each piston, said rotor having a port communicating with a combustion chamber and with the interior of said housing, a normally closed intake valve carried by each cylinder, one of said end walls having an elongated longitudinally arcuate fuel intake port for registration with said intake valve for a portion of the rotation of said rotor, a stationary spring-pressed abutment carried by said housing at said contact point, and means yieldably urging said sleeve valve to closing position, said yieldable means holding said sleeve valve in closed position under normal compression pressure and movable outwardly to contact with said cylindrical wall under explosive pressure, said yieldable means when in outward position constituting a swinging vane.

GEORGE FLOYD.